March 8, 1927.                    E. E. ROYAL                    1,620,234
SHUTTLE TIP
Filed July 20, 1925
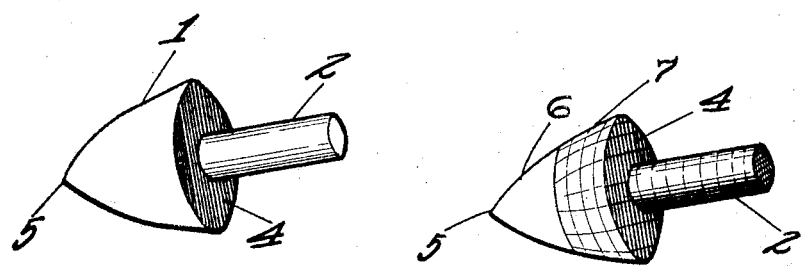
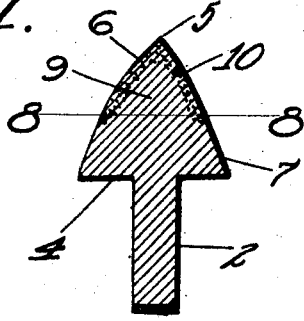
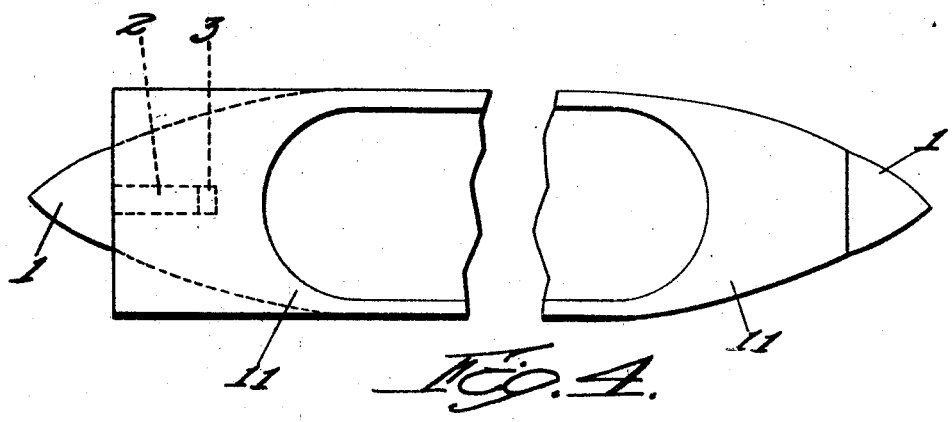
Inventor:
Ellery E. Royal
By attorney
Geo. H. Kennedy Jr.

Patented Mar. 8, 1927.

1,620,234

UNITED STATES PATENT OFFICE.

ELLERY E. ROYAL, OF WORCESTER, MASSACHUSETTS, ASSIGNOR TO UNITED STATES SCREW & STAMPING CO., OF WORCESTER, MASSACHUSETTS, A CORPORATION OF MASSACHUSETTS.

SHUTTLE TIP.

Application filed July 20, 1925. Serial No. 44,766.

Originally most shuttle tips were made by the drop forging process, but this was expensive and as the dies became worn, the tip would no longer conform to the exact required dimensions. Subsequently it became customary to turn the tips in an automatic lathe or screw machine out of about 40 point (.40%) carbon steel and then to harden the outer ends only. This hardening was done by placing the tips as rapidly as they became heated, in a special form of tray, so that only the very end of the tips would be quenched. The process was essentially a hand process, and therefore expensive. Moreover, .40% carbon steel does not cut well in such a machine, and a shuttle tip comprising soft steel throughout would be worthless.

By my invention I have not only made it possible to produce a shuttle tip at the highest rate of production, but the improvement, primarily designed to reduce cost has actually resulted in an improved tip.

The above and other advantageous features of the invention will hereinafter more fully appear, reference being had to the accompanying drawings, in which—

Fig. 1 is a perspective view of a shuttle tip as it is turned out by a screw machine.

Fig. 2 is a representation of a shuttle tip after the coating process.

Fig. 3 is a longitudinal section of a shuttle tip made in accordance with my invention.

Fig. 4 shows the usual shuttle with a pair of tips in order to make my invention better understood.

Like reference characters refer to like parts in the different figures.

Shuttle tips usually comprise generally conical portions 1 and a shank portion 2. Referring to Fig. 4, holes 3 are drilled in the ends of a shuttle and the shank 2 of a shuttle tip driven into each hole until the base 4 of the conical part is flush with the wood. The finishing of the wood is done after the insertion of the tips, so that the wood and steel will merge together in a surface having no breaks or protruding portions, in order that the flying shuttle may pass between the warp threads without breaking any of them. Ordinarily the shank portion 2 was corrugated in some manner, or had threads of high pitch as in a drive screw, so as to hold firmly in the wood of the shuttle. Although I may, if I prefer, so make my shank portion 2, yet I find it not necessary, as will hereinafter appear.

In the manufacture of shuttle tips according to my invention, round rod stock of what is known as "cold rolled steel" is preferably employed. That is to say, a low carbon steel desirably around 10 or 15 point is used, and cold rolled steel is a commercial variety of such material possessing an additional feature, i. e., having a smooth cylindrical surface, which makes it particularly adaptable to the action of a screw machine or automatic lathe. Such a machine should preferably be used in the well known manner, to turn out the shuttle tips in the form shown in Fig. 1. I have found that as much as 85% greater production of what I shall call these unfinished tips, as in Fig. 1, can be turned out on such a machine when using the low carbon soft steel over and above what was possible when using the high carbon (35 to 50 point) steel.

The next step in my process consists in coating the low carbon steel shuttle tip with some material which will resist the penetration of carbon as from a pack hardening compound under heat. I have found it convenient to electroplate the shuttle tip with copper. In this embodiment and for that purpose I lower a number of tips into an electrolytic bath, each tip being held with its axis vertical, and its vertex 5 uppermost, and for this purpose I have found it convenient to employ a plurality of electromagnets, each pole having a countersunk portion for the reception of a vertex 5. The iron of the electromagnet itself forms the cathode end with the shuttle tips themselves as the actual cathode. I leave the portion 6 of the tips out of the solution, so that all of each tip is plated excepting a substantially conical surface 6, which defines a cone that has desirably from one-third to one-half the altitude of the conical part as a whole. The relative dimensions are not, however, important, so long as a material conical surface of the tip is left unplated, and so long as a part or a portion of a conical surface 7 is actually plated.

With a number of tips now in the form illustrated in Fig. 2, where 2 indicates the plated shank, 4 indicates the base portion likewise plated, 7 indicates the frustum of a conical surface plated, and 6 indicates the conical surface unplated, I cause the shuttle tips to be placed in any usual or suitable form of pack hardening (otherwise known as case hardening) containers. The containers are then heated in the usual manner so as to produce an absorption of carbon in the steel to any usual depth. The portion 6 only will absorb the carbon, as all the other portions of the tip have been coated. The shuttle tips may then be taken out and heated to a suitable hardening temperature, and then they are quenched in water or oil or other suitable manner, or they may be quenched directly after removal from the pack hardening boxes if the temperature is enough. In so quenching, no particular care need be taken, and thus again my method distinguishes from the prior art, when each tip had to be carefully handled so as to quench the portion 6 only. Moreover, the result is a better product, for the quenching of the portion 6 alone set up strains in the metal, and it was a frequent occurrence for cracks to appear in tips so manufactured.

The tip as an article of manufacture is now complete, and a cross section of it shows it generally in the state depicted by the longitudinal section of Fig. 3. I have indicated the soft steel simply by the usual cross hatching, while the carbonized and hardened steel, commonly called the case 10, is indicated by stippling in between the cross hatching. I have arbitrarily drawn a line 8—8 across Fig. 3 and this line is the cut that would be made by the plane of the circular base of the portion 6. Normally a case $\frac{1}{32}$ to $\frac{1}{16}$ of an inch thick is sufficient. The case will extend slightly under the line 8—8 as the carbon penetrates in all directions, i. e., if the tip is "packed" long enough to give a penetration of $\frac{1}{32}$ of an inch, normally the case would penetrate about $\frac{1}{32}$ of an inch below the line 8—8. In case hardening there is no sharp line of demarcation between the case and the soft interior 9, and this is very advantageous as fissures, due to strain, are thus not liable to appear. As the case 10 merges into the portion 7 below the line 8—8, there will be no tendency for a crack at 8—8.

The copper coating has been found very advantageous on the shank 2, as it increases the gripping force between the wood 11 and the shank 2 over what it was as plain steel, probably because the coefficient of friction has been raised. So that I am enabled to advantageously use plain cylindrical shanks 2 and thus further decrease the cost of these articles.

Although the method of making the article of my invention has been described in order to disclose the best way known to me of manufacturing it, I am not limited to any particular process of manufacture, the scope of my invention being set forth in the following claims.

I claim—

1. As an article of manufacture, a shuttle tip having a case hardened end portion and a superimposed plating of metal on the shank.

2. As an article of manufacture, a soft steel shuttle tip having a case hardened end portion and a copper plated shank.

3. As an article of manufacture, a shuttle tip mainly composed of soft steel, a case hardened end portion near and including the vertex, the case hardened portion merging without any sharp line of demarcation into the soft steel, and a copper plated shank.

ELLERY E. ROYAL.